(12) United States Patent
Fukazawa et al.

(10) Patent No.: US 9,324,296 B2
(45) Date of Patent: Apr. 26, 2016

(54) IMAGE PROCESSING APPARATUS, METHOD AND PROGRAM

(75) Inventors: Kentaro Fukazawa, Tokyo (JP); Yoshinori Takagi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 856 days.

(21) Appl. No.: 13/598,912

(22) Filed: Aug. 30, 2012

(65) Prior Publication Data

US 2013/0063467 A1     Mar. 14, 2013

(30) Foreign Application Priority Data

Sep. 9, 2011    (JP) ................................. 2011-197181

(51) Int. Cl.
| | |
|---|---|
| G06T 11/00 | (2006.01) |
| G09G 5/02 | (2006.01) |
| G06K 9/46 | (2006.01) |
| G06T 7/40 | (2006.01) |

(52) U.S. Cl.
CPC ................ *G09G 5/02* (2013.01); *G06K 9/4652* (2013.01); *G06T 7/408* (2013.01); *G06T 11/001* (2013.01); *G06T 2207/10024* (2013.01)

(58) Field of Classification Search
None
See application file for complete search history.

(56) References Cited

U.S. PATENT DOCUMENTS

| | | | | |
|---|---|---|---|---|
| 5,442,736 A | * | 8/1995 | Cummins | ...................... 345/622 |
| 7,180,524 B1 | * | 2/2007 | Axelrod | ......................... 345/593 |

FOREIGN PATENT DOCUMENTS

JP     2006-345094 A     12/2006

OTHER PUBLICATIONS

Xiang ("Color Image Quantization by Minimizing the Maximum Intercluster Distance", ACM Transactions on Graphics (TOG) vol. 16 Issue 3, Jul. 1997 pp. 260-276).*
Virmajoki ("Fast Agglomerative Clustering using a k-Nearest Neighbor Graph", IEEE Transactions on Pattern Analysis and Machine Intelligence, vol. 28, No. 11, Nov. 2006).*

* cited by examiner

*Primary Examiner* — Mark Zimmerman
*Assistant Examiner* — Sohum Kaji
(74) *Attorney, Agent, or Firm* — Hazuki International, LLC

(57) ABSTRACT

Provided is an image processing apparatus including a cursor position acquisition section which acquires a position of a cursor on a display screen where an image is displayed, and a representative color acquisition section for performing a color reduction process which acquires a region including the position of the cursor acquired by the cursor position acquisition section as a color reduction processing region, and acquires a prescribed number of colors as representative colors, from colors included in the color reduction processing region.

14 Claims, 9 Drawing Sheets

FIG. 6
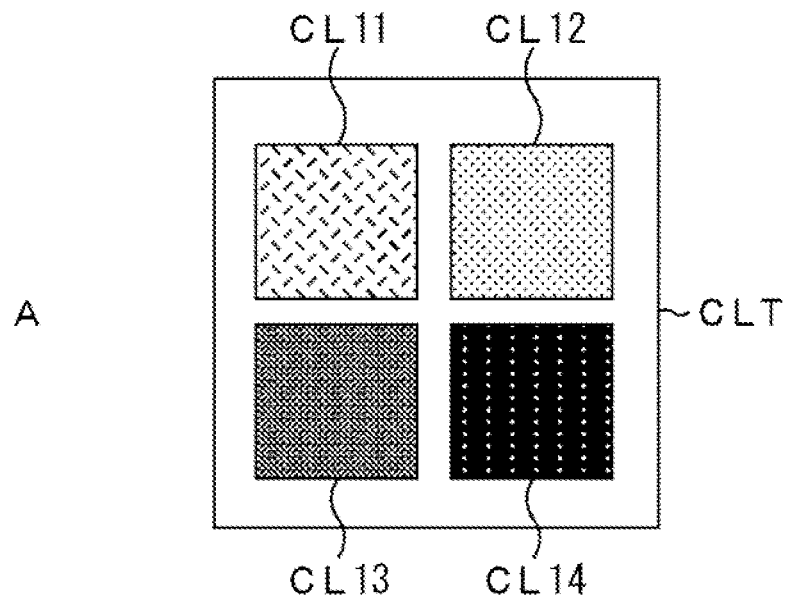
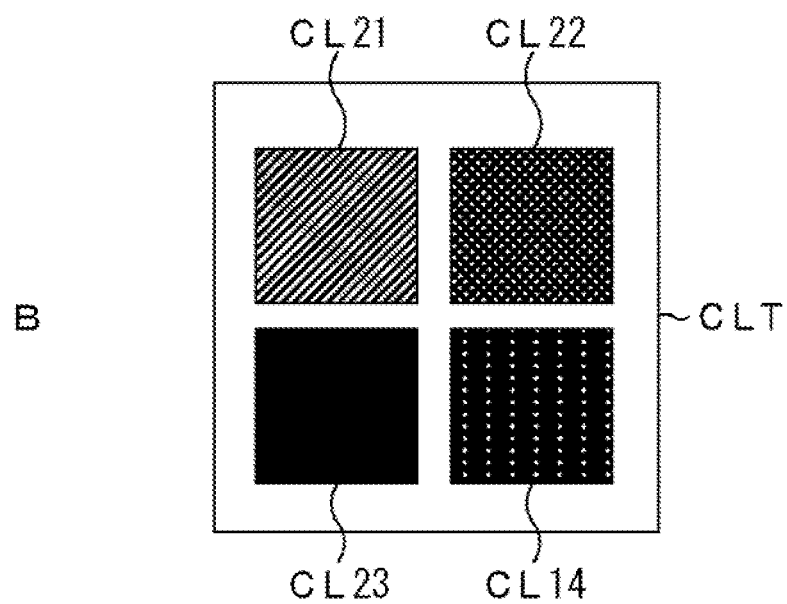

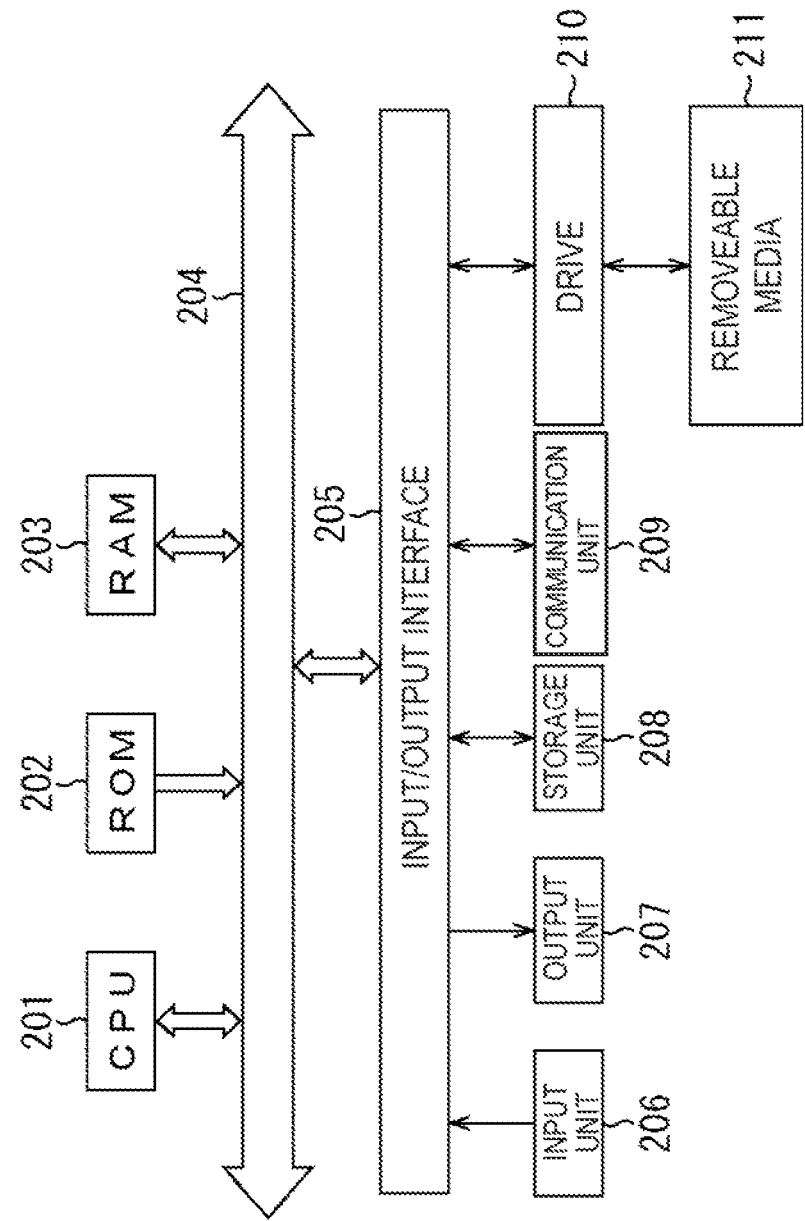

IMAGE PROCESSING APPARATUS, METHOD AND PROGRAM

CROSS-REFERENCE TO RELATED APPLICATION

The present application claims priority from Japanese Patent Application No. JP 2011-197181 filed in the Japanese Patent Office on Sep. 9, 2011, the entire content of which is incorporated herein by reference.

BACKGROUND

The present disclosure relates to an image processing apparatus, method and program, and more specifically to an image processing apparatus, method and program that can simplify the selection work of colors to be processed.

In recent times, even general users can perform editing of various images by using a personal computer or the like. For example, colors specified for a prescribed shaped figure can be incorporated. Further, the incorporated colors can be corrected. In related art, a user, in the case where an image process such as color correction is performed, performs work which selects colors to be processed from within an image by a mouse operation (for example, refer to JP 2006-345094A).

SUMMARY

However, there is a possibility that the work which selects, from a detailed region within the image, colors to be processed will be difficult for a user.

Further, for example, since the work which selects all colors included in a region where the colors are subtly different, such as the gradations of the sky, as the colors to be processed includes a mouse operation which selects all the colors across the entire region, there is a possibility that the work will take an extended amount of time for a user.

The present disclosure has been made in view of such a situation, and can simplify the selection work of the colors to be processed.

According to an embodiment of the present disclosure, there is provided an image processing apparatus including a cursor position acquisition section which acquires a position of a cursor on a display screen where an image is displayed, and a representative color acquisition section for performing a color reduction process which acquires a region including the position of the cursor acquired by the cursor position acquisition section as a color reduction processing region, and acquires a prescribed number of colors as representative colors, from colors included in the color reduction processing region.

The image processing apparatus may further include a display control section which performs control for displaying, as selection candidates, the prescribed number of representative colors acquired by the representative color acquisition section.

The color reduction process may be a process including k-means clustering.

The representative color acquisition section, in the case where a plurality of the representative colors are selected from the selection candidates, may generate a new cluster by integrating a plurality of clusters to which each of the plurality of representative colors belong.

The representative color acquisition section may further generate a new cluster by integrating another cluster within a certain range, from the plurality of clusters to which each of the plurality of representative colors belong.

The display control section, in the case where a prescribed representative color is selected from among the selection candidates, may display as new selection candidates a plurality of colors included in a cluster to which the selected prescribed representative color belongs.

The display control section may display the selection candidates by rearranging the selection candidates in an order RGB or HSL.

The display control section may display the selection candidates by plotting the selection candidates on a hue circle.

The display control section may display the color reduction processing region by color reduction using the selection candidates.

The representative color acquisition section may acquire cluster ranges to which the representative colors belong.

The image processing apparatus may further include an acquisition section which acquires, in the case where a prescribed representative color is selected from among the selection candidates, a cluster range to which the representative color acquired by the representative color acquisition section belongs.

An image processing method and program according to the embodiment of the present disclosure are the method and program corresponding to the image processing apparatus according to the embodiment of the present disclosure described above.

According to the embodiments of the present disclosure, there is provided an image processing apparatus, method and program, in which a position of a cursor on a display screen where an image is displayed is acquired, and a color reduction process is performed in which a region including the position of the acquired cursor is acquired as a color reduction processing region, and a prescribed number of colors are acquired as representative colors, from the colors included in the color reduction processing region.

According to the present disclosure as stated above, the selection work of colors to be processed can be simplified.

BRIEF DESCRIPTION OF THE DRAWINGS

FIG. 6 is a figure showing a display example of selection candidates in the selection candidate display region CLT;

FIG. 10 is a block diagram showing a configuration example of hardware of an image processing apparatus applicable to the present disclosure.

DETAILED DESCRIPTION OF THE EMBODIMENT(S)

Figure 1:
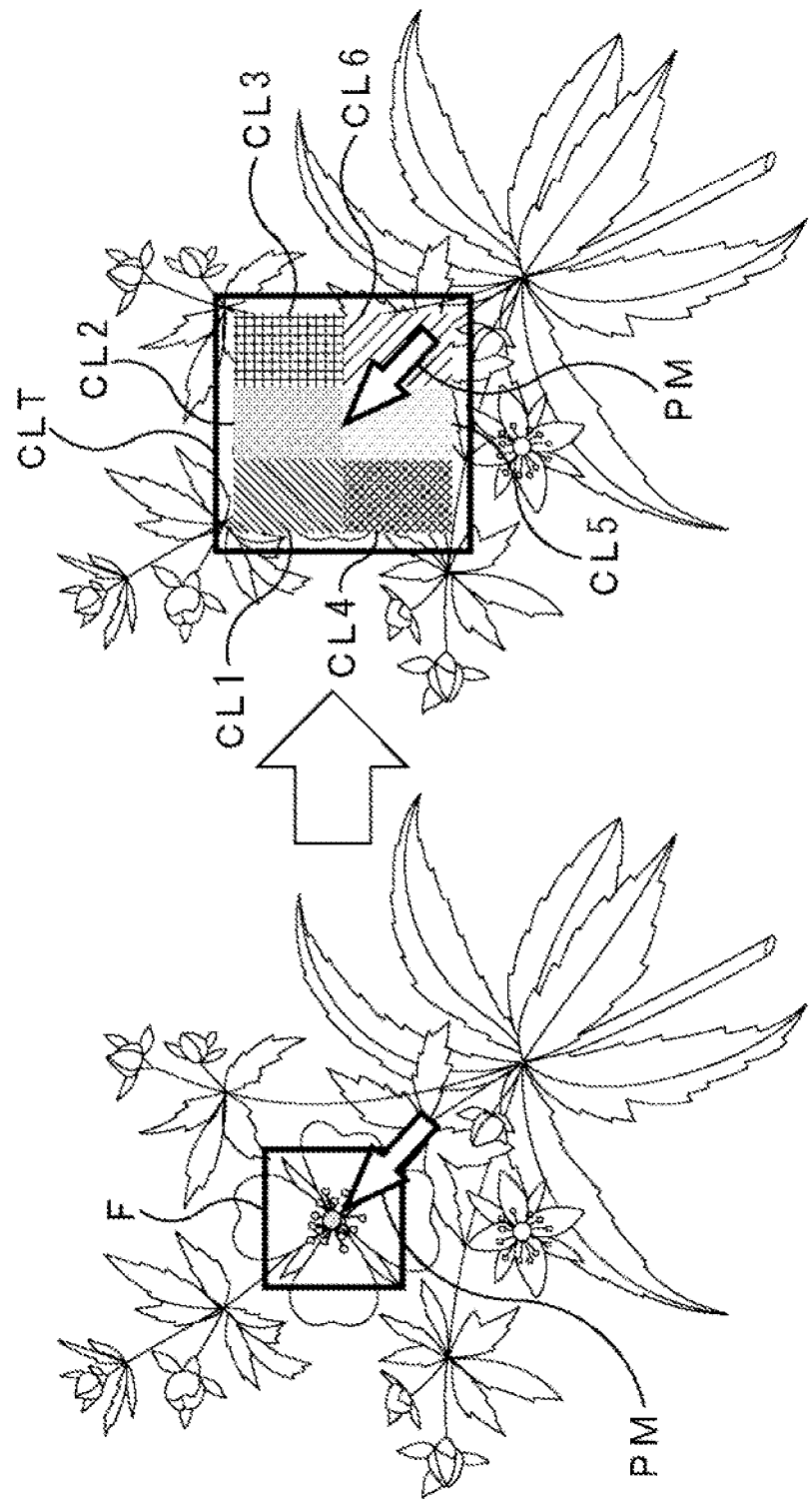
FIG. 1 is a figure describing the outline of the present disclosure.

Hereinafter, preferred embodiments of the present technology will be described in detail with reference to the appended drawings. Note that, in this specification and the appended drawings, structural elements that have substantially the same function and structure are denoted with the same reference numerals, and repeated explanation of these structural elements is omitted.

Firstly, in order to easily understand the present disclosure, an outline of the present disclosure will be described.

FIG. 1 is a figure for describing the outline of the present disclosure, and shows an example of a displayed image, in the case where work is performed which selects colors to be processed from an image process, such as color correction.

When it is assumed that a user intends to modify the colors of a prescribed part of a displayed image, a cursor PM of a pointing device such a mouse is positioned in this part, such as the image shown on the left hand side of FIG. 1. In this case, a region, within a prescribed range centered at the position indicated by the cursor PM, is set as a color reduction processing region F in which a color reduction process is applied. In the present embodiment, the color reduction process is a process which selects, from among a plurality of colors included in an image, only N representative colors (hereinafter called the representative colors) as selection candidates of the colors to be processed. Here, while N is an arbitrary integer value, it will be assumed that N is set beforehand.

Accordingly, such as the image shown on the right hand side of FIG. 1, a selection candidate display region CLT is displayed at the position indicated by the cursor CM. N representative colors, obtained as a result of the color reduction process applied to the color reduction processing region F, are displayed in the selection candidate display region CLT. In the example of the image shown on the right hand side of FIG. 1, N=6 representative colors, CL1 to CL6, are displayed as selection candidates in the selection candidate display region CLT.

When a user selects a prescribed representative color, from among the N selection candidates displayed in the selection candidate display region CLT, a plurality of colors included in a sample group to which this representative color belongs is displayed. Additionally from among this plurality of colors, the user can specify the colors used in an image process such as color correction. A plurality of colors selectable as the colors to be processed, that is, a plurality of selection candidates, is clustered beforehand into N sample groups. Accordingly, each of the N sample groups is hereinafter called a cluster. That is, a color constituting the central value of a cluster constitutes the representative color of this cluster.

In this way, instead of a plurality of selection candidates all being displayed, this plurality of selection candidates are classified into N clusters, and only N representative colors are displayed. This is equivalent to reducing the number of selection candidates being displayed to N. Therefore, the user can select, by fewer work operations, a prescribed color from among all the colors constituting an object to be processed, and thereby the difference of colors among the selection candidates can be easily understood.

Incidentally, in a general color reduction process, colors which have a low frequency of occurrence, in a small area used within the image, are difficult to obtain as representative colors, since the overall image is set as the target region of the color reduction process.

However, in the present disclosure, the target region of the color reduction process is limited to the color reduction processing region F, and the color reduction processing region F is a region within a prescribed range centered at a position indicated by the curser PM, that is, a region far smaller in comparison to the overall image.

Accordingly, for example, even if the frequency of occurrence of the colors constituting the object to be processed, in a small area of this object, is low for the overall image, by adopting the color reduction processing region F so as to include this object, the frequency of occurrence, in the color reduction processing region F, of the colors constituting this object will be relatively higher. Further, when the target region of the color reduction process is reduced by adopting the color reduction processing region F, the absolute number of colors included within this region will also decrease. Therefore, colors which constitute the object and to which the area used is small as seen from the overall image, in a word, colors which have a small sample number as seen from the overall image, can be retained as the representative colors.

In addition, the N representative colors obtained by the color reduction process are displayed in the selection candidate display region CLT, in a form which disregards the differences in their frequencies of occurrence. Therefore, even if the area of the object to be processed is small and the frequency of occurrence of a color constituting the object is low, the user can easily perform the work which selects these colors.

Example Configuration of an Image Processing Apparatus

Figure 2:
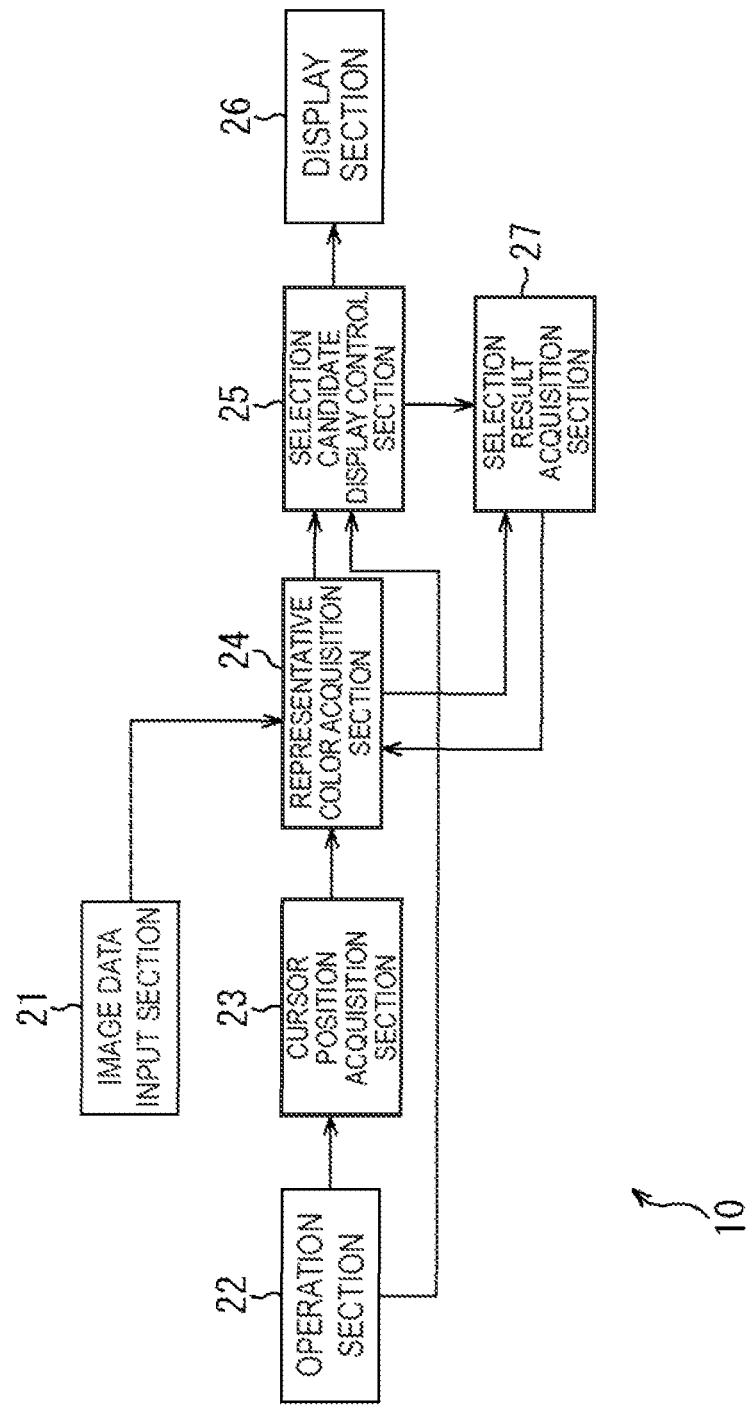
FIG. 2 is a block diagram showing a configuration example of an image processing apparatus applicable to the present disclosure.

FIG. 2 is a block diagram showing an example configuration of an image processing apparatus applicable to the present disclosure, which was described in the outline using FIG. 1.

As shown in FIG. 2, an image processing apparatus 10 has an image data input section 21, an operation section 22, a cursor position acquisition section 23, a representative color acquisition section 24, a selection candidate display control section 25, a display section 26, and a selection result acquisition section 27.

The image data input section 21 inputs image data to be processed from other information processing apparatuses or a storage section, not shown, and supplies the image data to the representative color acquisition section 24.

The operation section 22 receives an operation of a pointing device, such as a mouse, by a user, and supplies an operation signal corresponding to this operation to the cursor position acquisition section 23.

The cursor position acquisition section 23 acquires the coordinates of the current position P of the cursor PM displayed on the display section 26, based on an operation signal supplied from the operation section 22, and supplies the coordinates to the representative color acquisition section 24.

The representative color acquisition section 24 sets, as the color reduction processing region F, a region within a prescribed range centered at the current position P of the cursor PM supplied from the cursor position acquisition section 23. Next, the representative color acquisition section 24 acquires N representative colors from a plurality of colors included in the color reduction processing region F, by applying a color reduction process to the color reduction processing region F. Here, an acquisition technique of the representative colors, while not particularly limited, can adopt a technique using, for example, a median cutting method or k-means clustering (hereinafter, called a k-means method). Further, the representative color acquisition section 24 also acquires a cluster range to which each of the N representative colors belongs, along with the acquisition of the N representative colors. Here, the cluster range is both an upper and a lower limit for each of the R, G and B colors included in the cluster.

In the case where the representative color acquisition section 24 performs a color reduction process adopting a k-means method, first of all it may be necessary to set an initial value for the central values of each cluster. However, an appropriate clustering result may often not be attainable by an initial value set in a k-means method.

Accordingly, in the present disclosure, a representative color acquired at a previous position P of the cursor CM, that is, a central value of a previous cluster, is set as an initial value. Even if the current position P of the cursor PM is updated, it is rare for the image features of the color reduction processing region F (namely, the colors) to significantly change, since this movement is small. Therefore, by comparing the clustering result of the case where a representative color acquired at the previous position P of the cursor CM is set as an initial value for the central value of the previous cluster, with the clustering result of the case where the initial value for a central value of the current cluster is set, the former case can reduce the divergence of each clustering result between the previous and current times. Further, the former case can better decrease the time that may be necessary for the convergence of the clustering.

Further, in a k-means method, the representative color acquisition section 24 has to predetermine the cluster number. However, for example, even in the case where one object to be processed is configured by a similar color, that is, even in the case where a small number of representative colors that have been acquired is suitable, if many clusters are set, many representative colors corresponding to each of the many clusters that have been set are obtained. In such a case, if the user does not thoroughly select these many representative colors, there is the possibility that the user may find it difficult to use, in an image process, the colors included in the clusters to which these representative colors belong. That is, in the case where the number of set representative colors is unnecessarily large, the user may take an extended amount of time to specify the colors to be processed.

Accordingly, the user can integrate a plurality of clusters, as a process different from specifying the colors to be processed, and can perform a process for reducing the number of clusters (and accordingly, the number of representative colors). In the case where the user selects or specifies a plurality of representative colors for integrating representative colors, the representative color acquisition section 24 reduces the cluster number, by integrating the plurality of clusters to which each of the selected plurality of representative colors belong. Then, the representative color acquisition section 24 acquires new representative colors, from new clusters generated as a result of integrating the plurality of clusters. It becomes possible for the user to specify the colors to be processed, from among the new representative colors acquired in this way. Here, cluster integration will be described by referring to FIGS. 3 and 4.

Cluster Integration

Figure 3:
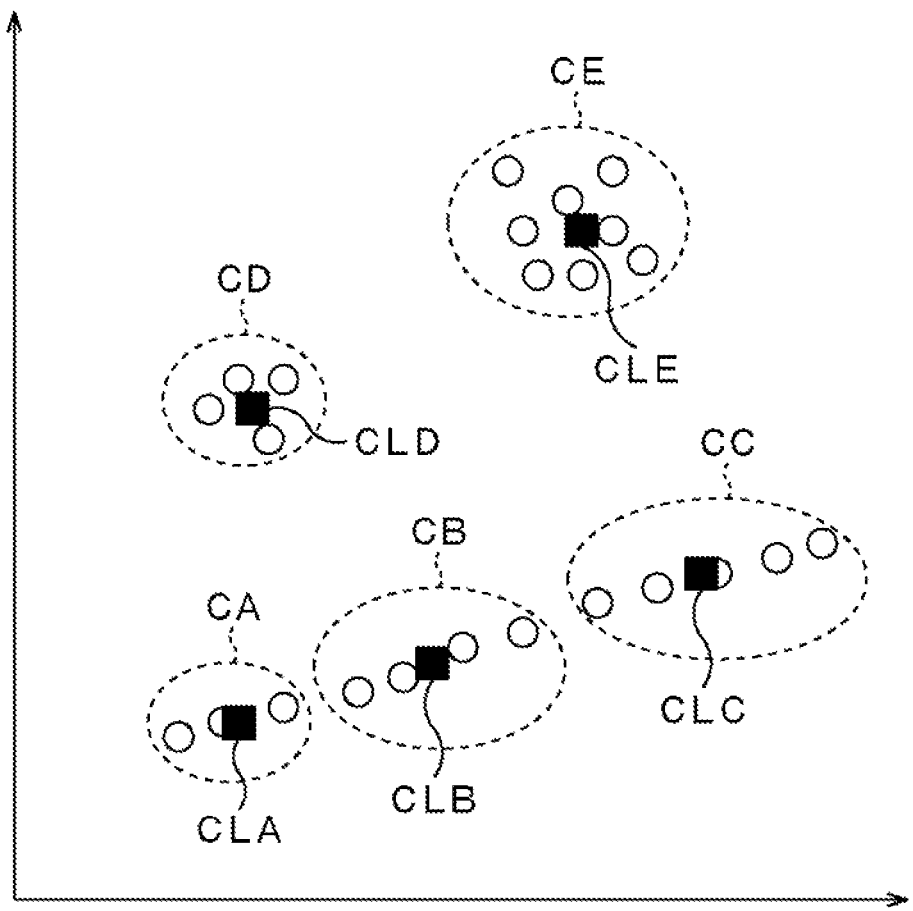
FIG. 3 is a figure showing a distribution of clusters.

FIG. 3 is a figure showing a distribution of clusters. While clusters are positioned in a three dimensional color space including R, G and B, for the convenience of the description, FIG. 3 shows a two dimensional color space which has adopted two arbitrary colors from among R, G and B in a vertical and horizontal axis.

As shown in FIG. 3, clusters CA, CB, CC, CD and CE are distributed in a two dimensional color space. White round markers within the clusters show image feature points indicating a pixel color, and squares show the center of the clusters, namely, the representative colors. The representative colors of the clusters CA, CB, CC, CD and CE are the representative colors CLA, CLB, CLC, CLD and CLE, respectively.

For example, for the integration of representative colors, in the case where the representative color CLA of the cluster CA is selected by the user, and the representative color CLB of the cluster CB is additionally selected after the representative color CLA is in a selected state, the cluster CA and the cluster CB are integrated, and a new cluster CA' is generated.

In addition, in this case, in the case where a cluster within a region determined on the basis of the clusters CA and CB, and a cluster CC on an extended line of the clusters CA and CB, for example, satisfy a prescribed condition, the cluster CA may be added to the cluster CB, and the cluster CC may be integrated.

Note that a condition, such as shown below, can be used, for example, as the prescribed condition.

That is, in the case where it is assumed that the representative color CLA of the cluster CA is a starting point and the representative color CLB of the cluster CB is an ending point, it can be assumed that a vector between the representative colors CLA and CLB is a vector VAB. Further, it can be assumed that a unit vector of the vector VAB is a unit vector UVAB.

Similarly, in the case where it is assumed that the representative color CLA of the cluster CA is a starting point and the representative color CLN of the cluster CN is an ending point, it can be assumed that a vector between the representative colors CLA and CLN is a vector VAN. Further, it can be assumed that a unit vector of the vector VAN is a unit vector UVAN.

In this case, a condition, in which the magnitude of the difference vector between the unit vector UVAB and the unit vector UVAN is at or below a previously set threshold, can be adopted as a prescribed condition.

Namely, the representative color acquisition section 24 calculates a difference vector between the unit vector UVAB and the unit vector UVAN, and judges whether or not a condition, in which the magnitude of the calculated difference vector is at or below a previously set threshold, is satisfied. Then, in the case where the prescribed condition is judged to be satisfied, the representative color acquisition section 24 integrates the cluster CN along with the clusters CA and CB, and generates a new cluster. Details of the processes for such cluster integration (hereinafter, called a cluster integration process) will be described by referring to FIG. 4.

Cluster Integration Process

Figure 4:
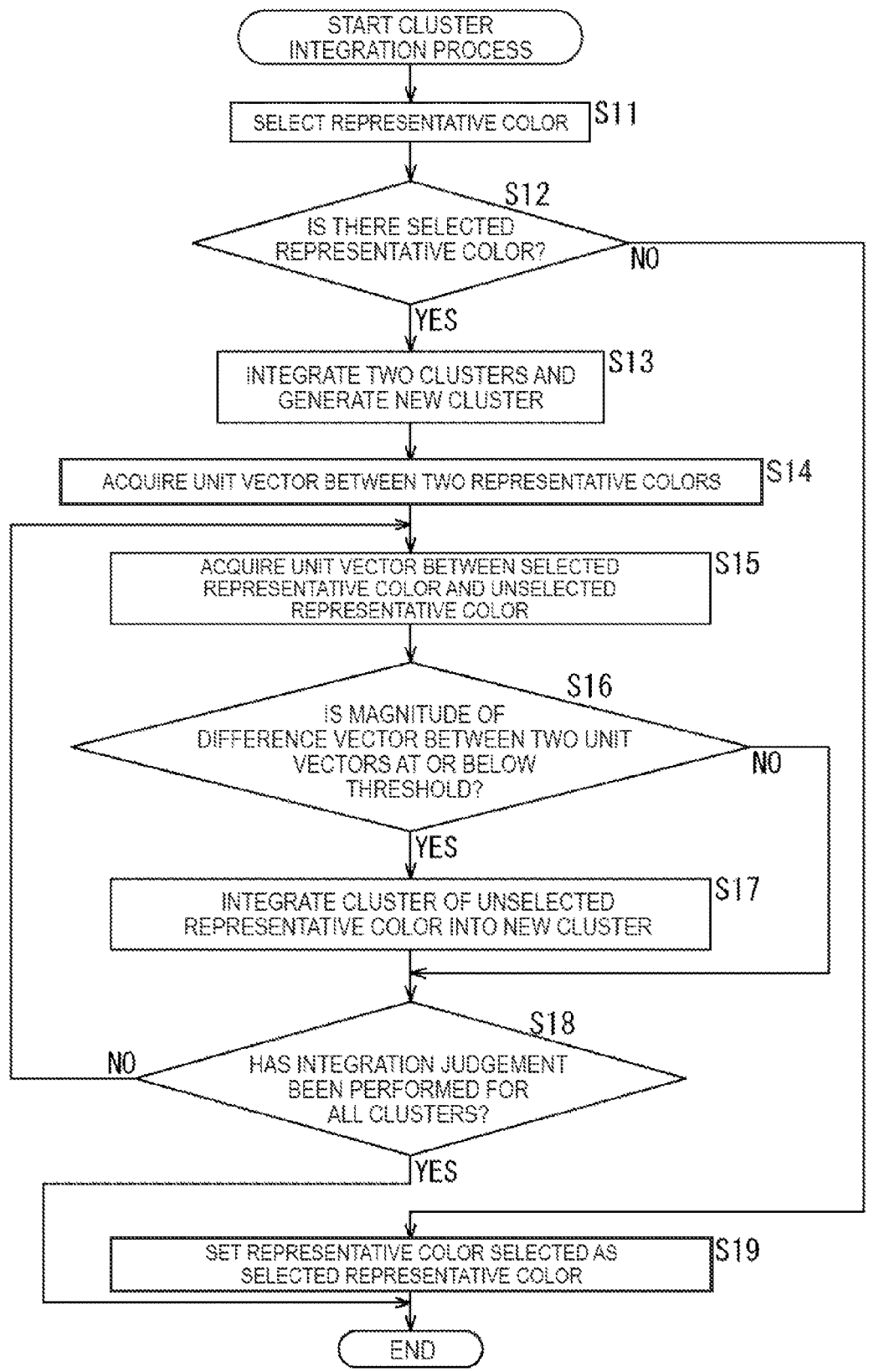
FIG. 4 is a flow chart describing the flow of a cluster integration process.

FIG. 4 is a flow chart describing the flow of a cluster integration process.

In step S11, the representative color acquisition section 24 selects a prescribed representative color based on an operation of the user. Here, it will be assumed that the representative color CLB, for example, is selected based on an operation of the user.

In step S12, the representative color acquisition section 24 judges whether or not there is a selected representative color. That is, the representative color acquisition section 24 judges whether or not an operation, in which other representative colors have been selected, has already been performed by the user.

In the case where there is a selected representative color, it is judged to be YES in step S12, and the process proceeds to step S13. Here it will be assumed that the representative color CLA, for example, is selected based on an operation of the user.

In step S13, the representative color acquisition section 24 integrates two clusters, and generates a new cluster. In this case, the cluster CB is integrated into the cluster CA, and new cluster CA' is generated. That is, the representative color acquisition section 24 integrates the cluster CB, to which the representative color CLB selected by step S11 belongs, into the cluster CA, to which the selected representative color CLA belongs.

In step S14, the representative color acquisition section 24 acquires a unit vector between the two representative colors. In this case, the unit vector UVAB between the representative colors CLA and CLB is acquired.

In step S15, the representative color acquisition section 24 acquires a unit vector between the selected representative color and an unselected representative color. In this case, the unit vector UVAN between the representative colors CLA and CLN is acquired. That is, the representative color acquisition section 24 acquires the unit vector UVAN between the representative color CLA and the representative color CLN of an arbitrary cluster CN.

In step S16, the representative color acquisition section 24 judges whether or not the magnitude of a difference vector between the two unit vectors is at or below a threshold. In this case, whether or not the magnitude of a difference vector between the unit vectors UVAB and UVAN is at or below a threshold is judged. That is, the representative color acquisition section 24 judges whether or not the arbitrary cluster CN is within a region determined on the basis of the clusters CA and CB.

In the case where the magnitude of the difference vector is at or below the threshold, it is judged to be YES in step S16, and the process proceeds to step S17.

In step S17, the representative color acquisition section 24 integrates the clusters of the unselected representative colors into a new cluster. In this case, the cluster CN of the unselected representative color CLN targeted by step S15 is integrated into the new cluster CA' generated by step S13.

In the case where the magnitude of the difference vector is not at or below the threshold, it is judged to be NO in step S16, the process of step S17 is skipped, and the process proceeds to step S18.

In the case where it is judged to be NO in step S16 and after the process of step S17, in step 18, the representative color acquisition section 24 judges whether or not integration judgment has been performed for all the clusters. Note that integration judgment is the judgment of step S16 based on the process of step S15.

In the case where integration judgment has not been performed for all the clusters, it is judged to be NO in step S18, the process returns to step S15, and the processes from here are repeated. That is, the processes of step S15 through to step S18 are repeated until integration judgment has been performed for all the clusters.

In the case where integration judgment has been performed for all the clusters, it is judged to be YES in step S18, and the cluster integration process ends.

In the case where there is no selected representative color, it is judged to be NO in step S12, and the process proceeds to step S19.

In step S19, the representative color acquisition section 24 assumes that the representative color CLB selected in step S11 is the selected representative color. In a word, in this case, since a plurality of representative colors have not been selected, a process which integrates the clusters is not performed.

In this way, the cluster integration process ends.

In this way, in the case where the user selects a plurality of representative colors for integrating the plurality of representative colors, this plurality of representative colors is considered to be one representative color by being integrated. In this way, since the number of additional selection candidates is reduced, it becomes possible for the user to more easily perform selection work of the colors to be processed. In addition to this case, since the user can integrate together the representative colors within a certain range from the selected representative colors, the number of selection candidates can be further reduced.

The N representative colors acquired by the representative color acquisition section 24 in this way are supplied to the selection candidate display control section 25.

Returning to FIG. 2, the selection candidate display control section 25 displays, on part of the screen of the display section 26, the selection candidate display region CLT which includes as selection candidates each of the N representative colors acquired by the representative color acquisition section 24.

Example Arrangement of the Selection Candidate Display Region CLT

Figure 5:
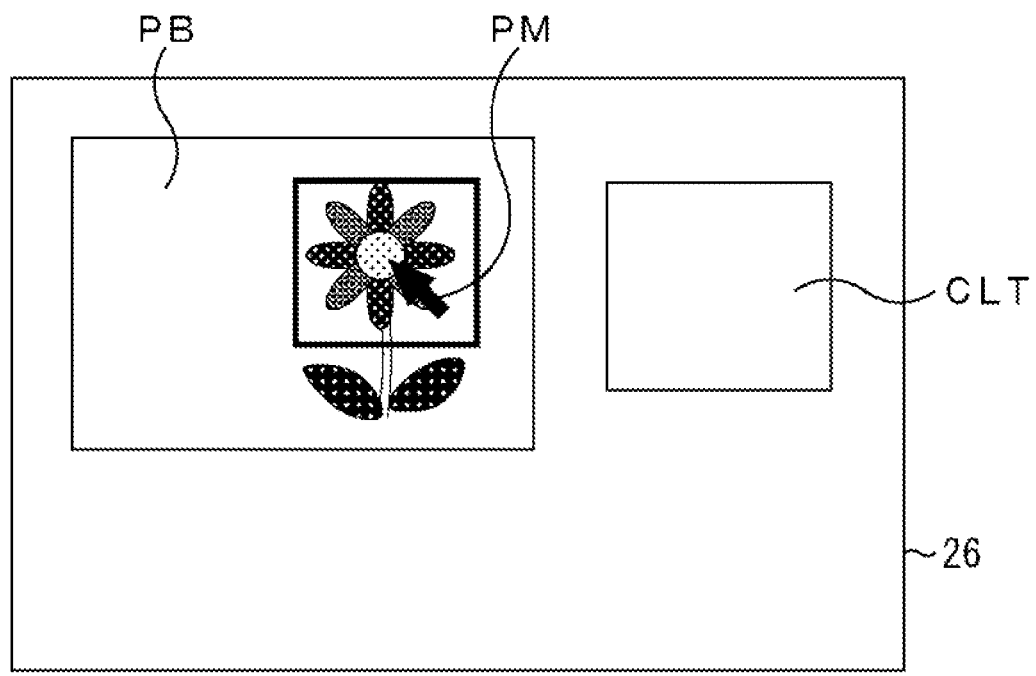
FIG. 5 is a figure showing an arrangement example of a selection candidate display region CLT.

FIG. 5 is a figure showing an arrangement example, on a display screen of the display section 26, of the selection candidate display region CLT.

As shown in FIG. 5, a preview region PB, where an image to be processed is preview-displayed, and the selection candidate display region CLT are provided on a display screen of the display section 26. Note that the arranged position of the selection candidate display region CLT is not limited to the example of FIG. 5, and as shown in FIG. 1, for example, the selection candidate display region CLT may be at a position indicated by the cursor PM.

Example Display of the Representative Colors

An example display of the representative colors in the selection candidate display region CLT will be described by referring to FIGS. 6 to 8.

FIG. 6 is a figure showing a display example of the selection candidates in the selection candidate display region CLT.

In the example of FIG. 6, 4 (that is, N=4) representative colors C11 to CL14 are displayed in the selection candidate display region CLT by being rearranged, for example, in an arbitrary order such as RGB or HSL.

In the case where a prescribed representative color is selected by a user's cursor operation, from within the selection candidate display region CLT, the selection candidate display control section 25 may acquire, as new selection candidates, each of the plurality of colors included in the cluster to which the selected prescribed representative color belongs, may generate a new screen including this plurality of selection candidates in the selection candidate display region CLT, and may display the new screen on the display section 26.

For example, in the case where the representative color CL14 is selected by a user's cursor operation, as shown in FIG. 6, each of the colors CL21 to CL23 acquired from the cluster to which the representative color CL14 belongs, in addition to the representative color CL14, are displayed as new selection candidates in the selection candidate display region CLT. The selection candidate display control section 25 may repeat this process a number of times. In this way, it becomes possible for colors not selected as representative colors to be displayed as selection candidates.

Figure 7:
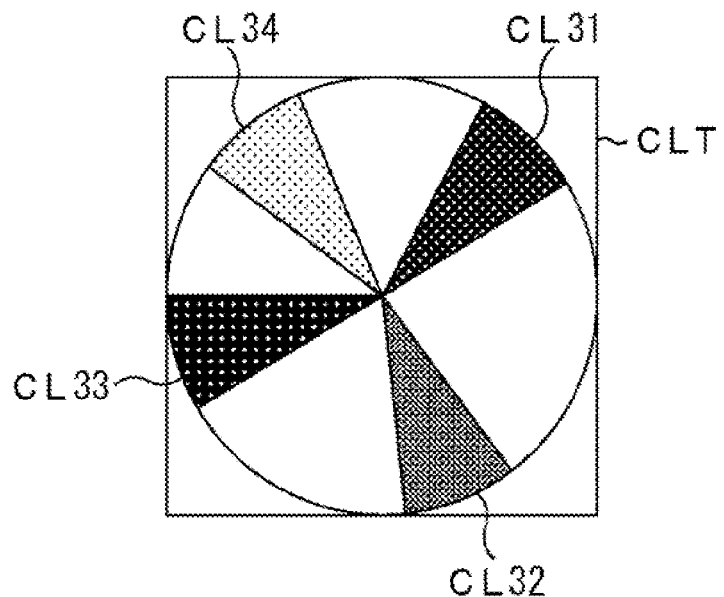
FIG. 7 is a figure showing another display example of selection candidates in the selection candidate display region CLT.

FIG. 7 is a figure showing another display example of the selection candidates in the selection candidate display region CLT.

As shown in FIG. 7, 4 (that is, N=4) colors CL31 to CL34 are displayed in the selection candidate display region CLT by being plotted as selection candidates on a hue circle. In the case where there are no selection candidates corresponding to the region on the hue circle, there will be nothing displayed in the region of this hue circle.

Also in the display technique shown in FIG. 7, in a manner similar to the example described above, for example, in the case where the representative color CL32 is selected by a user's cursor operation, the selection candidate display control section 25 may acquire, as new selection candidates, each of the plurality of colors acquired from the cluster to which the representative color CL32 belongs, in addition to the representative color CL32, may generate a new screen including this plurality of selection candidates in the selection candidate display region CLT, and may display the new screen on the display section 26.

Figure 8:
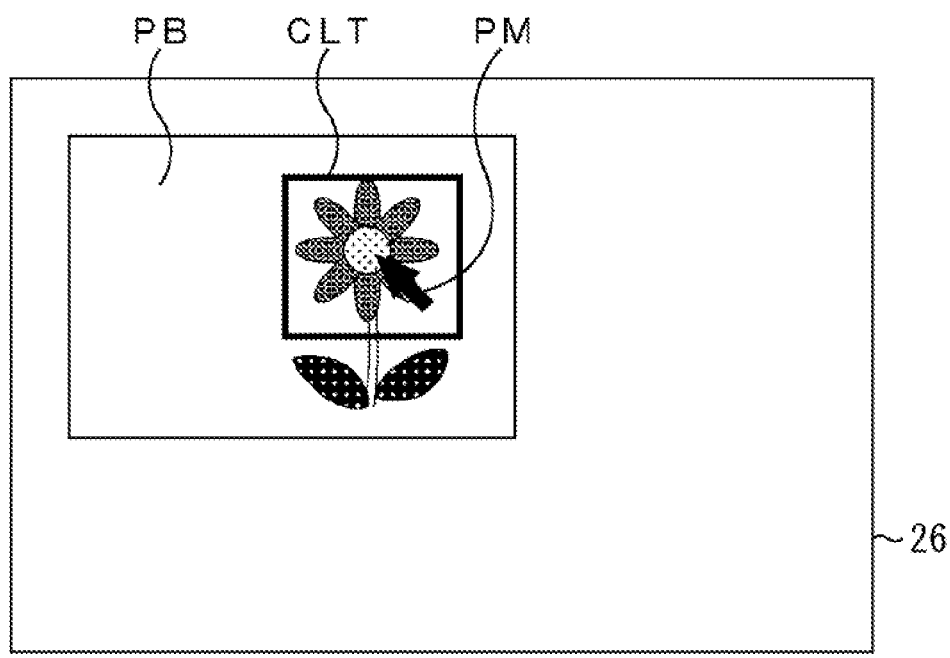
FIG. 8 is a figure showing another display example of selection candidates in the selection candidate display region CLT.

FIG. 8 is a figure showing another display example of the selection candidates in the selection candidate display region CLT.

As shown in FIG. 8, an image, which has color reduced the image of the color reduction processing region F centered at a position indicated by the cursor PM, by using the representative colors of the selection candidates, is displayed in the selection candidate display region CLT. That is, an image, in which the colors of each pixel of the color reduction processing region F have been replaced by the representative colors of the clusters to which these colors belong, is displayed. In this case, the selection candidate display control section 25 may display the selection candidate display region CLT in an enlarged manner, that is, display the color reduced image in an enlarged manner.

Also in the display technique shown in FIG. 8, in a manner similar to the example described above, in the case where a prescribed representative color is selected, the selection candidate display control section 25 may acquire, as new selection candidates, each of the plurality of colors acquired from the cluster to which the selected representative color belongs, may generate an image which is color reduced by this plurality of selection candidates, and may display the image on the display section 26.

Returning to FIG. 2, the selection result acquisition section 27 acquires, as selection colors, the colors selected by an operation of the user, from the selection candidates displayed on the selection candidate display region CLT. Further, the selection result acquisition section 27 acquires, from the representative color acquisition section 24, a cluster range to which the selection colors belong, that is, an upper and lower limit for each of the colors R, G and B included in the cluster. The selection colors acquired by the selection result acquisition section 27 are used for an image process, such as color correction, in the image processing section, not shown. The user can perform an adjustment of the subtle color tones within the cluster range to which the selection colors belong, that is, within the range of the upper and lower limits for each of R, G and B, in an image process which uses the selection colors.

Selection Process of Colors to be Processed

Next, a series of processes (hereinafter, called a selection process for colors to be processed) until the image processing apparatus 10 selects the colors to be processed will be described by referring to FIG. 9.

Figure 9:
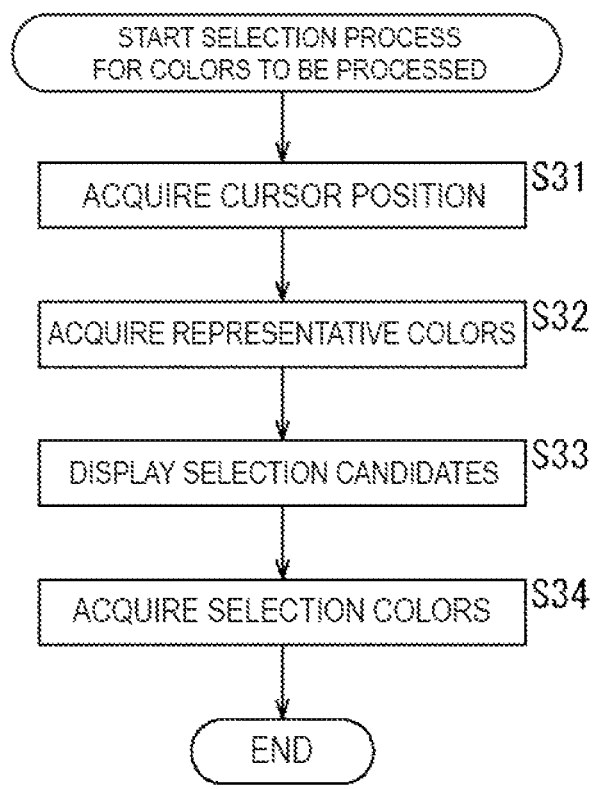
FIG. 9 is a flow chart describing the flow of a selection process for colors to be processed.

FIG. 9 is a flow chart describing the flow of the selection process for colors to be processed.

In step S31, the cursor position acquisition section 23 acquires the current position P of the cursor PM.

In step S32, the representative color acquisition section 24 acquires the representative colors. That is, the representative color acquisition section 24 acquires N representative colors included in the color reduction processing region F, by applying a color reduction process to the color reduction processing region F centered at the current position P of the cursor PM acquired by the process of step S31. Further, in this case, an integration process of suitable representative colors is performed, based on an operation of the user.

In step S33, the selection candidate display control section 25 displays, as selection candidates, the N representative colors acquired by step S32, on the selection candidate display region CLT. That is, as described by using FIGS. 6 to 8, the selection candidate display control section 25 displays, as selection candidates, N representative colors in the selection candidate display region CLT.

In step S34, the selection result acquisition section 27 acquires, from the selection candidates displayed in the selection candidate display region CLT, the selection colors selected by the operation of the user.

In this way, the selection process of colors to be processed ends.

In the image processing apparatus 10 applicable to the present disclosure as described above, since the number of selection candidates displayed is reduced, a user can simplify the selection work of colors to be processed.

Application of Present Technology to Program

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

FIG. 10 is a block diagram showing an example configuration of the hardware of a computer that executes the series of processes described earlier according to a program.

In the computer, a central processing unit (CPU) 201, a read only memory (ROM) 202 and a random access memory (RAM) 203 are mutually connected by a bus 204.

An input/output interface 205 is also connected to the bus 204. An input unit 206, an output unit 207, a storage unit 208, a communication unit 209, and a drive 210 are connected to the input/output interface 205.

The input unit 206 is configured from a keyboard, a mouse, a microphone or the like. The output unit 207 configured from a display, a speaker or the like. The storage unit 208 is configured from a hard disk, a non-volatile memory or the like. The communication unit 209 is configured from a network interface or the like. The drive 210 drives a removable media 211 such as a magnetic disk, an optical disk, a magneto-optical disk, a semiconductor memory or the like.

In the computer configured as described above, the CPU 201 loads a program that is stored, for example, in the storage unit 208 onto the RAM 203 via the input/output interface 205 and the bus 204, and executes the program. Thus, the above-described series of processing is performed.

Programs to be executed by the computer (the CPU 201) are provided being recorded in the removable media 211 which is a packaged media or the like. Also, programs may be provided via a wired or wireless transmission medium, such as a local area network, the Internet or digital satellite broadcasting.

In the computer, by inserting the removable media 211 into the drive 210, the program can be installed in the storage unit 208 via the input/output interface 205. Further, the program can be received by the communication unit 209 via a wired or wireless transmission media and installed in the storage unit 208. Moreover, the program can be installed in advance in the ROM 202 or the storage unit 208.

It should be noted that the program executed by a computer may be a program that is processed in time series according to the sequence described in this specification or a program that is processed in parallel or at necessary timing such as upon calling.

The embodiment of the present technology is not limited to the above-described embodiment. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing apparatus including:
a cursor position acquisition section which acquires a position of a cursor on a display screen where an image is displayed; and
a representative color acquisition section for performing a color reduction process which acquires a region including the position of the cursor acquired by the cursor position acquisition section as a color reduction processing region, and acquires a prescribed number of colors as representative colors, from colors included in the color reduction processing region.

(2) The image processing apparatus according to (1), further including:
a display control section which performs control for displaying, as selection candidates, the prescribed number of representative colors acquired by the representative color acquisition section.

(3) The image processing apparatus according to (1) or (2), wherein the color reduction process is a process including k-means clustering.

(4) The image processing apparatus according to any of (1) to (3),
wherein the representative color acquisition section, in a case where a plurality of the representative colors are selected from the selection candidates, generates a new cluster by integrating a plurality of clusters to which each of the plurality of representative colors belong.

(5) The image processing apparatus according to any of (1) to (4),
wherein the representative color acquisition section further generates a new cluster by integrating another cluster within a certain range, from the plurality of clusters to which each of the plurality of representative colors belong.

(6) The image processing apparatus according to any of (1) to (5),
wherein the display control section, in a case where a prescribed representative color is selected from among the selection candidates, displays as new selection candidates a plurality of colors included in a cluster to which the selected prescribed representative color belongs.

(7) The image processing apparatus according to any of (1) to (6),
wherein the display control section displays the selection candidates by rearranging the selection candidates in an order RGB or HSL.

(8) The image processing apparatus according to any of (1) to (7),
wherein the display control section displays the selection candidates by plotting the selection candidates on a hue circle.

(9) The image processing apparatus according to any of (1) to (8),
wherein the display control section displays the color reduction processing region by color reduction using the selection candidates.

(10) The image processing apparatus according to any of (1) to (9),
wherein the representative color acquisition section acquires cluster ranges to which the representative colors belong.

(11) The image processing apparatus according to any of (1) to (10), further including:
an acquisition section which acquires, in a case where a prescribed representative color is selected from among the selection candidates, a cluster range to which the representative color acquired by the representative color acquisition section belongs.

For example, the present disclosure can be applied to an editing apparatus which edits content.

The invention claimed is:

1. An image processing apparatus comprising:
a cursor position acquisition section which acquires a position of a cursor on a display screen where an image is displayed; and
a representative color acquisition section which:
acquires a region including the position of the cursor acquired by the cursor position acquisition section as a color reduction processing region,
acquires a prescribed number of colors as representative colors from colors included in the color reduction processing region,
generate a new cluster, in a case where a first representative color of a first cluster and a second representative color of a second cluster are selected from the representative colors, by integration of the first cluster and the second cluster, and
integrate the new cluster and another cluster, which includes an unselected representative color, based on a first unit vector and a second unit vector,
wherein the first unit vector is a unit vector between the selected first representative color and the selected second representative color, and
wherein the second unit vector is a unit vector between the unselected representative color of the other cluster and either of the selected first representative color or the selected second representative color.

2. The image processing apparatus according to claim 1, further comprising:
a display control section which performs control for displaying, as selection candidates, the prescribed number of representative colors acquired by the representative color acquisition section.

3. The image processing apparatus according to claim 1, wherein the color reduction process is a process including k-means clustering.

4. The image processing apparatus according to claim 2, wherein the representative color acquisition section, in a case where the first representative color and the second representative color are selected from the selection candidates, generates the new cluster by integration of the first cluster and the second cluster.

5. The image processing apparatus according to claim 4, wherein the representative color acquisition section integrates the new cluster and the other cluster by integrating the other cluster within a certain range, from the first cluster and the second cluster to which the first representative color and the second representative color belong.

6. The image processing apparatus according to claim 2, wherein the display control section, in a case where a prescribed representative color is selected from among the selection candidates, displays as new selection candidates a plurality of colors included in a cluster to which the selected prescribed representative color belongs.

7. The image processing apparatus according to claim 6, wherein the display control section displays the selection candidates by rearranging the selection candidates in an order RGB or HSL.

8. The image processing apparatus according to claim 6, wherein the display control section displays the selection candidates by plotting the selection candidates on a hue circle.

9. The image processing apparatus according to claim 6, wherein the display control section displays the color reduction processing region by color reduction using the selection candidates.

10. The image processing apparatus according to claim 3, wherein the representative color acquisition section acquires cluster ranges to which the representative colors belong.

11. The image processing apparatus according to claim 10, further comprising:
an acquisition section which acquires, in a case where a prescribed representative color is selected from among the selection candidates, a cluster range to which the prescribed representative color acquired by the representative color acquisition section belongs.

12. The image processing apparatus according to claim 1, wherein the integration of the new cluster and the other cluster is based on a magnitude of difference between the first unit vector and the second unit vector.

13. An image processing method of an image processing apparatus, comprising:
acquiring a position of a cursor on a display screen where an image is displayed; and
performing a color reduction process which:
acquires a region including the acquired position of the cursor as a color reduction processing region,
acquires a prescribed number of colors as representative colors, from colors included in the color reduction processing region,
generates a new cluster, in a case where a first representative color of a first cluster and a second representative color of a second cluster are selected from the representative colors, by integration of the first cluster and the second cluster, and
integrates the new cluster and another cluster, which includes an unselected representative color, based on a first unit vector and a second unit vector,
wherein the first unit vector is a unit vector between the selected first representative color and the selected second representative color, and
wherein the second unit vector is a unit vector between the unselected representative color of the other cluster and either of the selected first representative color or the selected second representative color.

14. A non-transitory computer-readable medium having stored thereon, a set of computer-executable instructions for causing an information processing apparatus to perform steps comprising:
acquiring a position of a cursor on a display screen where an image is displayed; and
performing a color reduction process which comprises:
acquiring a region including the position of the as a color reduction processing region, and
acquiring a prescribed number of colors as representative colors from colors included in the color reduction processing region,
generating a new cluster, in a case where a first representative color of a first cluster and a second representative color of a second cluster are selected from the representative colors, by integration of the first cluster and the second cluster, and
integrating the new cluster and another cluster, which includes an unselected representative color, based on a first unit vector and a second unit vector,
wherein the first unit vector is a unit vector between the selected first representative color and the selected second representative color, and
wherein the second unit vector is a unit vector between the unselected representative color of the other cluster and either of the selected first representative color or the selected second representative color.

* * * * *